(12) United States Patent
Shannon

(10) Patent No.: US 11,371,649 B2
(45) Date of Patent: Jun. 28, 2022

(54) REUSABLE ADHESIVE MOUNT DEVICE FOR PORTABLE ELECTRONICS

(71) Applicant: FLIPSTIK, LLC, St. Louis, MO (US)

(72) Inventor: Akeem Shannon, Saint Louis, MO (US)

(73) Assignee: Flipstik, LLC, St. Louis, MO (US)

( * ) Notice: Subject to any disclaimer, the term of this patent is extended or adjusted under 35 U.S.C. 154(b) by 0 days.

(21) Appl. No.: 16/232,707

(22) Filed: Dec. 26, 2018

(65) Prior Publication Data

US 2019/0257466 A1 Aug. 22, 2019

Related U.S. Application Data

(60) Provisional application No. 62/634,146, filed on Feb. 22, 2018.

(51) Int. Cl.
| | |
|---|---|
| *F16M 13/00* | (2006.01) |
| *G09F 23/00* | (2006.01) |
| *H04M 1/06* | (2006.01) |
| *A45C 11/18* | (2006.01) |
| *A45C 11/00* | (2006.01) |

(52) U.S. Cl.
CPC .......... *F16M 13/005* (2013.01); *A45C 11/18* (2013.01); *A45C 11/182* (2013.01); *G09F 23/00* (2013.01); *H04M 1/06* (2013.01); *A45C 2011/002* (2013.01); *A45C 2200/15* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,508,451 | B1 * | 1/2003 | Blythe | F16M 11/10 248/351 |
| 6,695,273 | B2 * | 2/2004 | Iguchi | F16M 11/22 248/351 |
| 7,845,612 | B2 * | 12/2010 | Mase | H05K 5/0204 248/121 |
| 8,124,216 | B2 * | 2/2012 | Antonini | B32B 3/00 428/172 |
| 8,172,191 | B1 * | 5/2012 | Zimbalatti | F16M 11/10 16/266 |
| 8,844,098 | B2 * | 9/2014 | Karmatz | B25G 1/102 16/422 |
| 9,259,077 | B2 * | 2/2016 | Murphy | F16M 13/00 |
| 9,277,038 | B1 * | 3/2016 | Wheatley | F16M 11/10 |
| 9,300,346 | B2 * | 3/2016 | Hirsch | H04B 1/385 |
| 9,565,909 | B2 * | 2/2017 | Song | A45C 11/00 |
| 9,681,718 | B1 * | 6/2017 | Poole | A45C 11/00 |
| 10,368,628 | B1 * | 8/2019 | Durfee, Jr. | A45C 1/06 |
| D904,388 | S * | 12/2020 | Martin | D14/253 |

(Continued)

*Primary Examiner* — Monica E Millner
(74) *Attorney, Agent, or Firm* — Thompson Coburn LLP

(57) ABSTRACT

A device having a top half and a bottom half divided by a perforated hinge mechanism is provided. The top half may contain a graphic image and be used as a protective cover or kickstand, and the bottom half contains a reusable elastomeric adhesive. The adhesive can be on both sides of the bottom half. The device can be used to mount any flat, non-porous or semi-porous object to another flat, non-porous or semi-porous surface or object. The shape and size of the device does not affect its functionality and can therefore be modified as needed.

13 Claims, 16 Drawing Sheets

(56) References Cited

U.S. PATENT DOCUMENTS

| | | | |
|---|---|---|---|
| 2005/0205623 A1* | 9/2005 | Buntain | A45F 5/00 224/217 |
| 2006/0121250 A1* | 6/2006 | Wheatley | B60R 11/00 428/141 |
| 2010/0122756 A1* | 5/2010 | Longinotti-Buitoni | A45C 11/00 150/165 |
| 2010/0222118 A1* | 9/2010 | Interdanato | H04B 1/385 455/575.6 |
| 2011/0077061 A1* | 3/2011 | Danze | H04M 1/185 455/575.1 |
| 2011/0192857 A1* | 8/2011 | Rothbaum | F16M 11/041 220/694 |
| 2011/0266316 A1* | 11/2011 | Ghalib | A45F 5/00 224/217 |
| 2011/0294556 A1* | 12/2011 | Carlberg | A45C 11/00 455/575.8 |
| 2012/0031937 A1* | 2/2012 | Baker | A45C 11/00 224/217 |
| 2012/0168336 A1* | 7/2012 | Schmidt | H04M 1/04 206/478 |
| 2012/0188693 A1* | 7/2012 | Chiang | F16M 11/10 361/679.01 |
| 2012/0267402 A1* | 10/2012 | Beatty | A45F 5/00 224/218 |
| 2012/0305735 A1* | 12/2012 | McSweyn | F16M 13/00 248/451 |
| 2014/0251368 A1* | 9/2014 | Lawson | A45C 11/00 132/287 |
| 2014/0364176 A1* | 12/2014 | Pintor | H04B 1/385 455/575.6 |
| 2016/0039357 A1* | 2/2016 | Jang | B60R 11/0252 224/567 |
| 2016/0049983 A1* | 2/2016 | Ripka | H04M 1/04 455/575.6 |
| 2016/0345715 A1* | 12/2016 | Lin | A45F 5/00 |
| 2018/0146078 A1* | 5/2018 | Shin | A45C 11/00 |
| 2018/0235338 A1* | 8/2018 | Lamb | A45C 13/001 |

\* cited by examiner

REUSABLE ADHESIVE MOUNT DEVICE FOR PORTABLE ELECTRONICS

CROSS-REFERENCE TO RELATED APPLICATION

The present invention claims priority to and the benefit of U.S. Provisional Patent Application No. 62/634,146 filed Feb. 22, 2018, the contents of which are incorporated herein by reference.

FIELD OF THE INVENTION

The present invention is generally directed to a device that can be mounted to a back surface of a smartphone or other small electronic apparatus, and more particularly, to a device that includes a first portion and second portion connected to the first portion by a hinge that can be mounted to a smart phone to keep the smartphone in an upright position.

DESCRIPTION OF THE PRIOR ART

We use our smartphones and portable electronics often. For example, we use them to watch videos, take "selfies," play games, listen to music, make phone calls, etc.

There are a number of drawbacks with traditional smartphones or similar devices. In some instances, we want to use our devices while also freeing up the use of our hands. While some devices offer the ability to prop the device using a "kickstand" there are often no surfaces (i.e. tables countertops) on which to prop the device. One option to cure this problem is to carry a tripod with you everywhere you go—however, this is highly impractical. Alternatively, one can use a traditional adhesive such as glue or duct tape to adhere the phone to a surface, but such adhesives are typically permanent and often cause damage to the surface or device.

In other instances we are concerned with maintaining a firm grip on the smartphone to prevent it from falling. A dropped smartphone can result in cracked screens and other damage.

Typical cases used with smartphones are not conducive to carrying additional items. Such items must be kept in a wallet, purse or other similar containers.

The present invention provides a device that can be connected to a smartphone or other similar device that overcomes some or all of such drawbacks associated therewith.

SUMMARY OF THE INVENTION

The present invention employs a reusable elastomeric adhesive to allow a user to mount a smartphone to nearly any non-porous or semi-porous flat surface including leather, mirrors, glass, metal, woods, tile, drywall, human skin and more. The present invention also offers a protective covering that doubles as a kickstand.

Sometimes we need to mount objects other than our smartphone, such as cooking utensils, keys, picture frames, and remotes. The present invention also allows the user to mount these devices to surfaces as well as to other objects.

The present invention's adhesive leaves no residue, and is completely reusable. It can be cleaned, and restored to full functionality by rinsing with running water.

In accordance with one aspect of the invention, a device that can be mounted to a portable electronic apparatus is provided. The device comprises a first portion and a second portion connected to the first portion by a hinge. The second portion includes a first side and an opposing second side. An adhesive material is provided on the first side of the second portion for connecting the second portion to an electronic device, such as a smart phone.

The adhesive can be a reusable adhesive. In this regard, it can be an elastomeric material. Other similar or suitable adhesives can also be used.

The first portion can be formed as a generally flat, planar sheet. Similarly, the second portion can be formed as a generally flat, planar sheet. The hinge can be a perforated portion between the first portion and the second portion. The first and second portions can be formed from plastic or other similar or suitable materials.

The device can further include a layer of a removable film covering the adhesive material on the first side of the second portion. This prevents the device from adhering to objects before it is placed on the smartphone or other objects.

The device can also include an adhesive material on the second side of the second portion to mount the device to a surface. In this instance, the device can also include a removable film covering the adhesive material on the second side of the second portion. When the device includes an adhesive on both sides of the second portion, it can be used to mount the smartphone (or other object the device is connected to—on the first side of the second portion) to another surface or object.

In operation, the first portion of the device is moveable about the hinge between a first closed configuration where the first portion is folded flat against the second portion and a second outward configuration where the first portion can support the electronic apparatus in an upright position. In the closed configuration, the first portion acts as a cover over the second surface of the second portion. This is important when the second surface includes an adhesive material.

The device can include a band connected to the first portion of the device, such as an elastic band. This allows a user to insert one or more fingers through the band to have a more secure grip on the smartphone or other object the device is connected to.

The device can also include a pocket formed in the first portion. The pocket can be sized to fit one or more credit cards or other similar cards or items. The band can be connected to an outer surface of the pocket.

The first portion can also include a graphical image or other indicia or designs. The image can be on one or both sides of the first portion.

In accordance with another aspect of the invention, a device comprises a top half and a bottom half divided by a perforated hinge mechanism. The top half contains a graphic image and can be used in one of a closed protective cover configuration and a kickstand configuration. The bottom half has a first side and a second side and a reusable elastomeric adhesive on both the first side and second side. An elastic band and/or a pocket can be part of the top half.

As used herein, directional words or phrases (e.g., top, bottom) are used with respect to the embodiments of the invention as shown and positioned in the Figures, and are not meant to limit the invention as being in such position(s).

The present device described herein allows a user to easily mount a smartphone to a wall. The device also allows a user to use it as a "kickstand."

The device also allows a user to mount household items such as knives, keys, picture frames, artwork, remotes as well as other household items to a wall or flat surface.

The device also allows a user to grip their phone (or other item) securely in their hand.

One portion of the device can be used to allow a user to protect an adhesive surface of the device with a cover that flips open.

The device also allows the user to display a printed graphic image on the cover of the device.

Other features and advantages of the invention will be apparent from the following specification taken in conjunction with the following Figures.

BRIEF DESCRIPTION OF THE DRAWINGS

To understand the present invention, it will now be described by way of example, with reference to the accompanying drawings and attachments in which.

DETAILED DESCRIPTION

Figure 1:
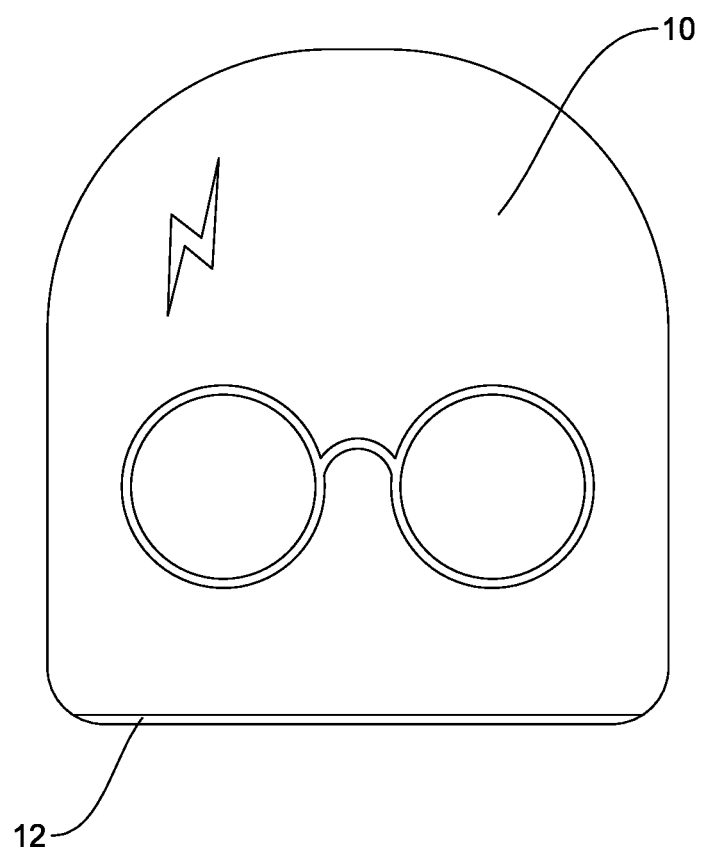
FIG. 1 is a front plan view of a top-half of a reusable adhesive mount device of the present invention resting on a flat surface.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

The following table lists elements of the illustrated embodiments of the invention and their associated reference numbers for convenience.

REF. NO.—ELEMENT

10—top-half of invention frame
12—hinge
14a—reusable adhesive front
14b—reusable adhesive back
16—bottom-half of invention frame
18—protective film cover attached prior to use
30—elastic band
40a—front-half of sleeve
40b—back-half of sleeve
200—user hand
210—smartphone
220—credit cards FIG. 1 shows the front-top of a reusable adhesive mount device in accordance with the present invention. The frame of the invention is made with a plastic material. However, other similar or suitable materials can be used. The device includes a first or top half or portion 10 and a second or bottom half or portion 16. The top half 10 of the device has a permanently adhered graphic design that shows when the device is in the closed position or configuration. The top half 10 of the device is separated from a bottom half 16 of the device by a hinge 12. The hinge 12 may be a perforated portion of the material forming the top half 10 and the bottom half 16. While the plastic frame of the invention is preferably one solid piece, this perforated hinge 12 provides flexibility and functionality.

Figure 2:
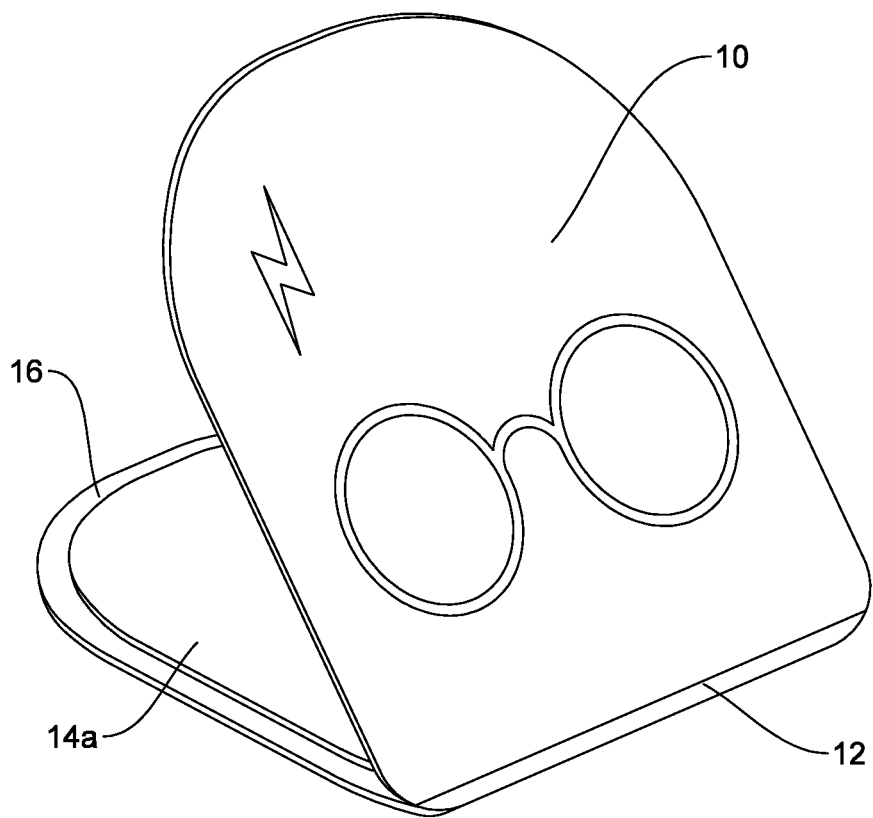
FIG. 2 is a perspective view of the device of FIG. 1.

FIG. 2 shows the top half of the device at an angle with respect to the bottom half of the device. The device is half-open, lying on a flat surface. The bottom half 16 of the device has a micro suction elastomeric adhesive material on either side 14a or 14b of the bottom half 16. The adhesive material is permanently attached to the device. Other suitable adhesives may also be used.

Figure 3:
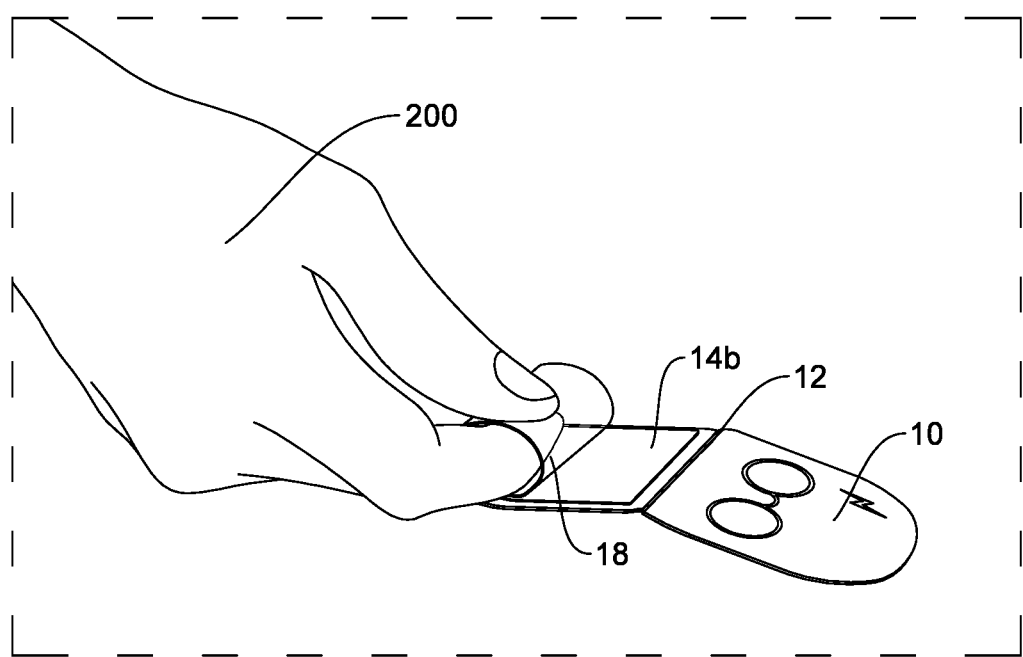
FIG. 3 is a perspective view of a user removing film from the adhesive section of the device of FIG. 1.

FIG. 3 shows the device lying open on a table with a user 200 removing a protective film 18 on one side 14b of the bottom half 16 (a separate film is covering the adhesive material on the other side 14a). The film 18 is used in the manufacturing and packaging processes and is discarded to expose the adhesive material 14b or 14a. The top half 10 of the device can be used as a protective covering for the adhesive material 14b or 14a after the film 18 has been discarded.

Figure 4:
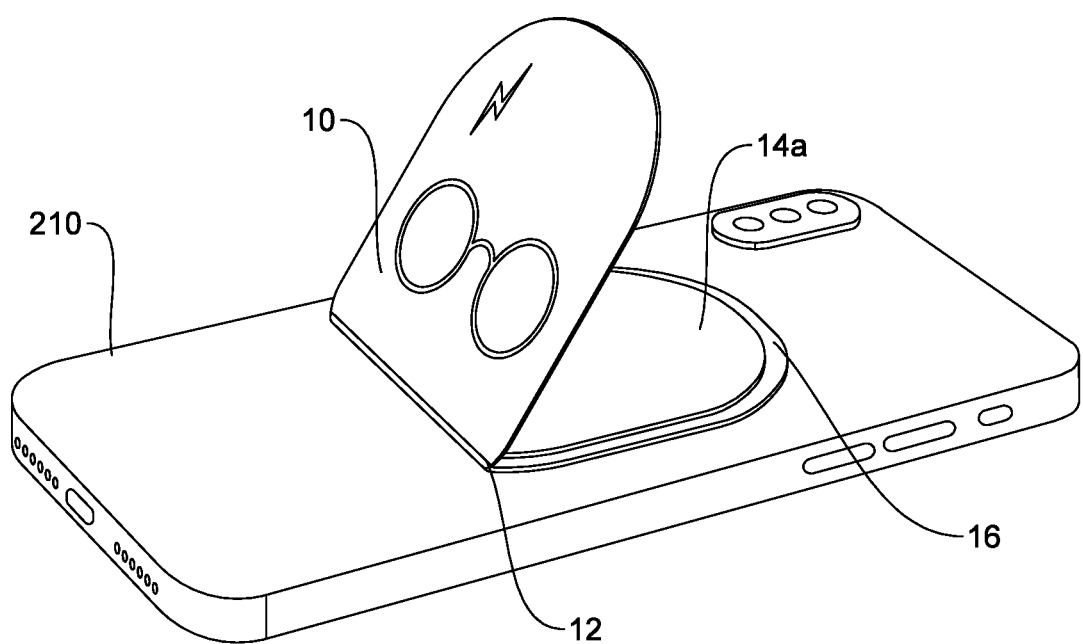
FIG. 4 is a perspective view of the device adhered to a smartphone in a half-open position.

FIG. 4 shows the device attached to a smartphone 210. The device is attached to the phone using the adhesive material on side 14b. The adhesive material 14a can be attached to any flat, non-porous or semi-porous surface to mount the device to said surface. The surface can be a wall, leather seat, mirror, glass, metal, wood etc. The adhesive material 14b is easily removable from the smartphone and can be relocated to another surface. The adhesive material 14a will hold the device in place unless the user forcibly attempts to dismount it. While shown mounted to a smartphone 210, the device of the present invention can be use with other small electronic devices or objects.

Figure 5:
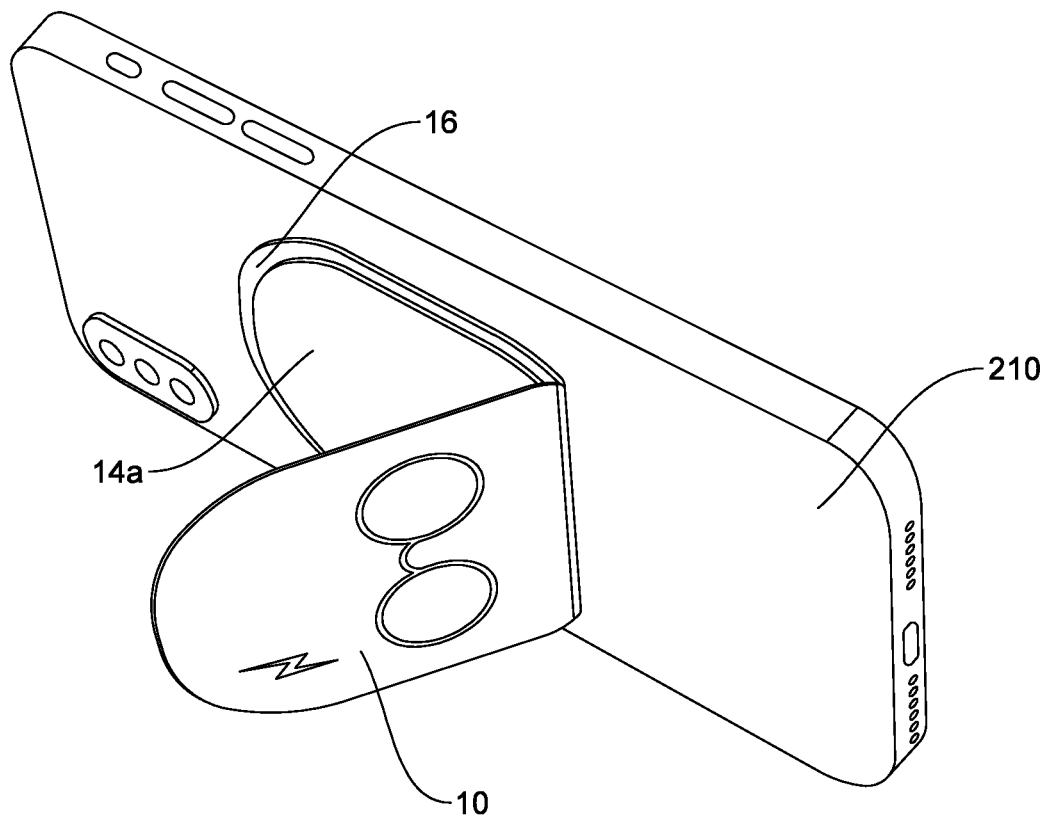
FIG. 5 is a perspective view of the device and smartphone of FIG. 4 with the device being used as a "kickstand" to prop up the smartphone.

FIG. 5 shows the device in a "kickstand" mode or configuration. The top half 10 of the device can be used to prop up the smartphone 210 when manipulation of the hinge 12 allows the device to rest at about a 90 degree angle relative to the smartphone 210. The screen of the smartphone is thus positioned in an upright position to enable viewing of videos, television, movies or other similar content.

Figure 6:
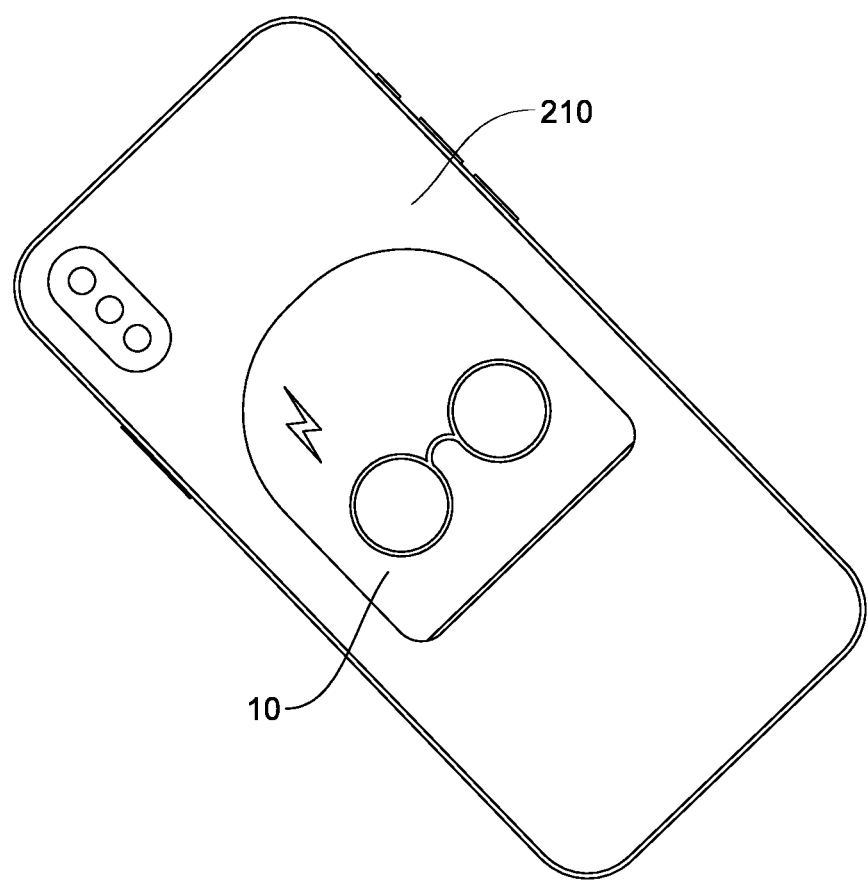
FIG. 6 is a top plan view of the device of FIG. 4 adhered to a smartphone in closed configuration.
Figure 7:
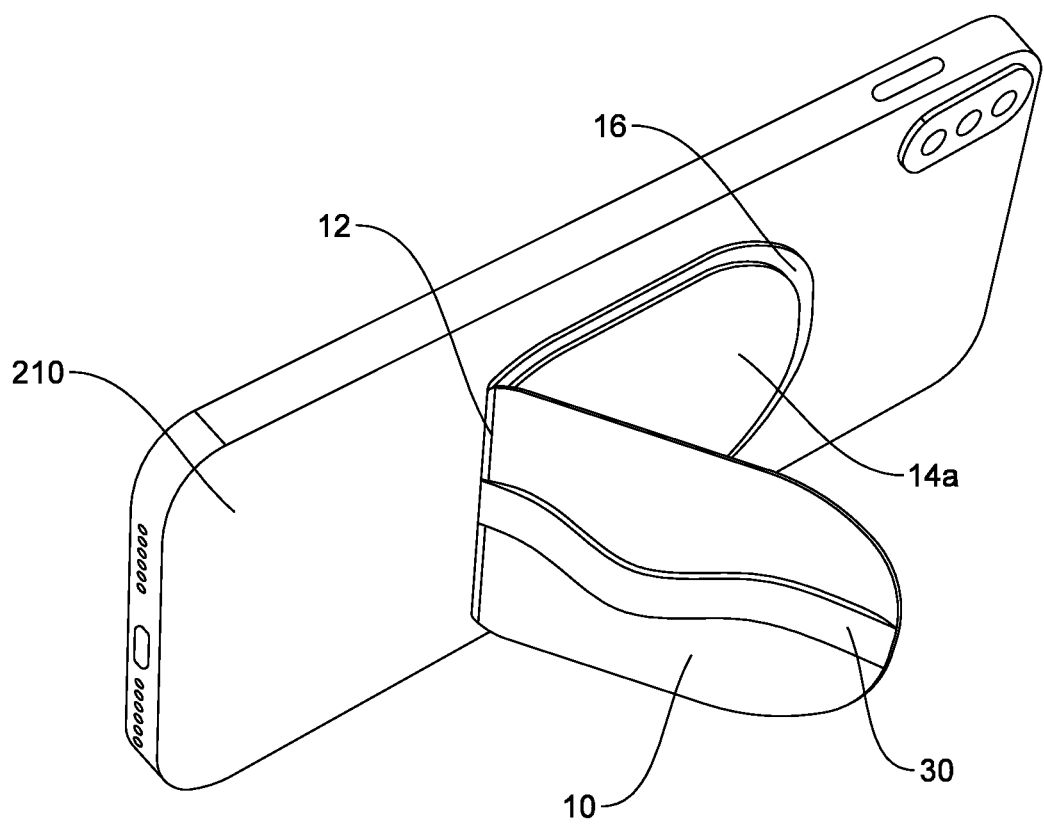
FIG. 7 is a perspective view of another aspect of the device in a "kickstand" configuration.
Figure 8:
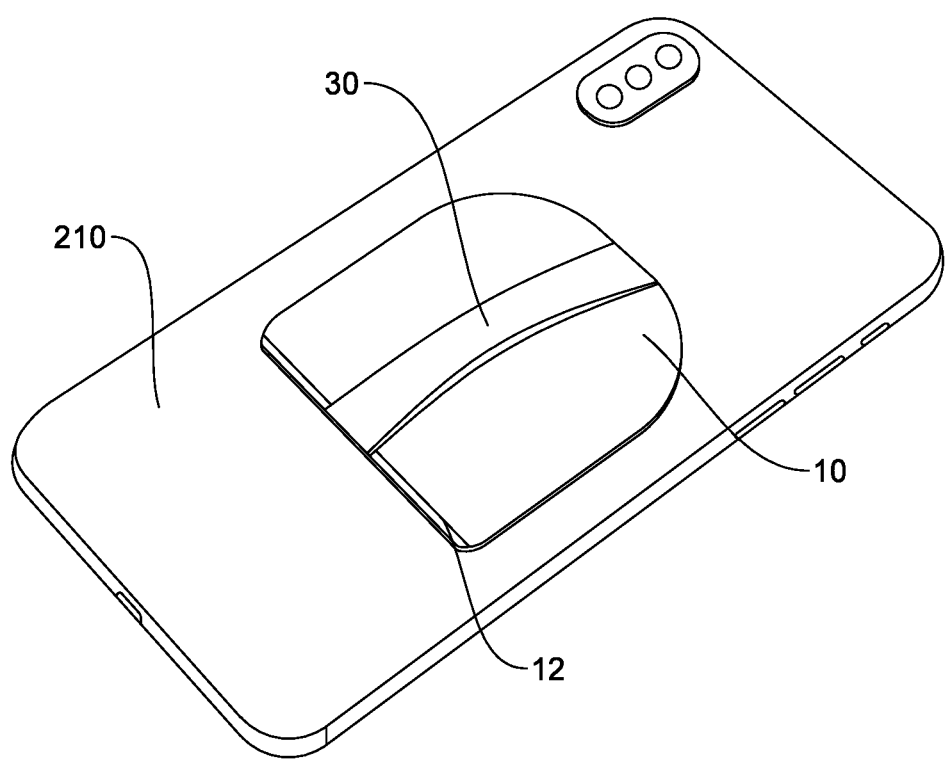
FIG. 8 is a top perspective view of the device of FIG. 7 in a closed configuration.
Figure 9:
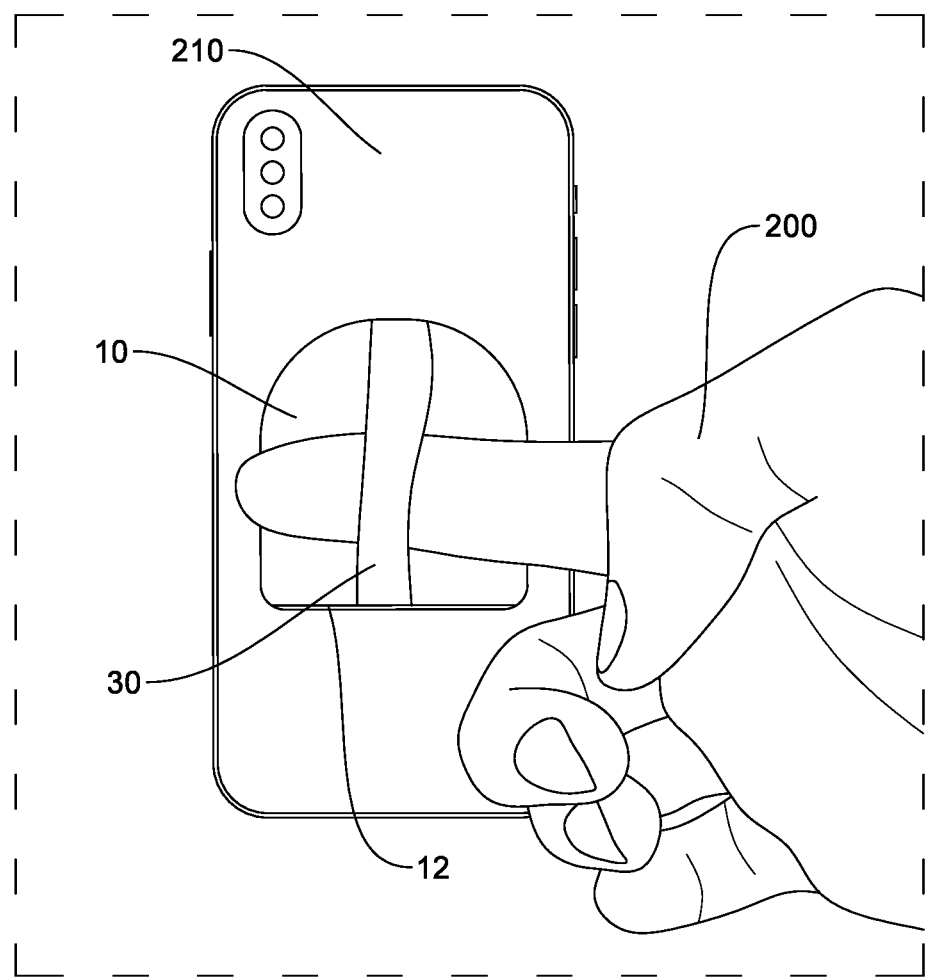
FIG. 9 is a perspective view of the device of FIG. 7 with a user's finger in a band on the device.
Figure 10:
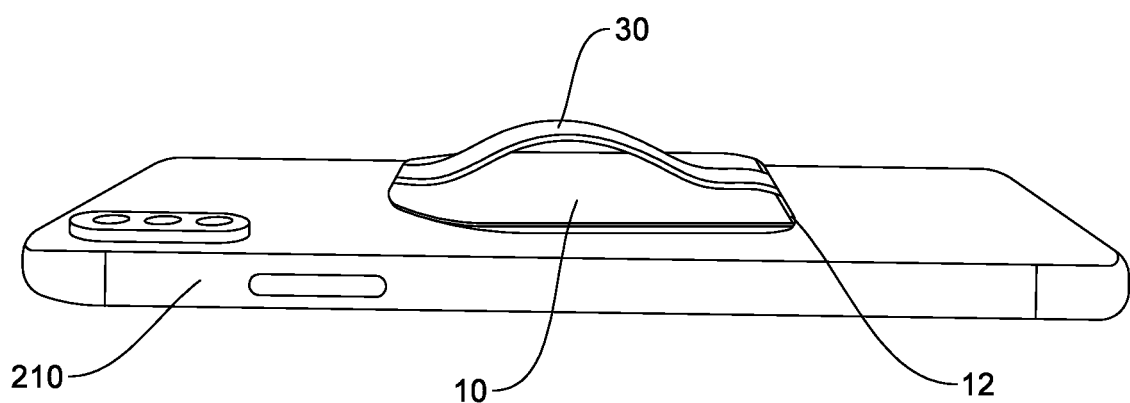
FIG. 10 is a side perspective view of the device of FIG. 7.

FIG. 6 shows the invention in a closed position or configuration. This means the front top half 10 faces outward, while protecting the reusable adhesive side 14a, which is attached to the outwardly facing side of the bottom half 16 of the device. The reusable adhesive of the other side 14b of the bottom portion 16 is attached to the smartphone 210.

The invention has several uses when attached to a smartphone or another device or object. The reusable adhesive 14a allows the user to mount the smartphone or another device to a wall or vertical surface. The reusable adhesive leaves no residue and can be cleaned by simply running water over the adhesive surface. This allows the user to take "selfies" (self portrait photos), watch videos, or do any task without the need to hold the phone with their hands. The top half 10 of the invention works as a protective cover to keep the adhesive 14a clean when not in use, it also doubles as a kickstand 10. The entire frame of the invention, both the top 10 and bottom 16 halves can be cut to any shape or size and are not limited to the shape and size pictured. The graphic image 10 on the top half 10 of the invention can be printed with any graphic image or design. The graphic image shown in the figures is for illustration purposes and is not a limitation of the invention.

The adhesive sides 14a and 14b of the bottom portion 16 can be used to mount many items other than electronic devices. Any flat, non-porous or semi-porous object can be mounted to any flat, non-porous or semi-porous surface or object. This means that you can attach two objects together such as a pencil to a notebook or a portable battery pack to a tablet. Non electronic devices such as picture frames can be easily mounted to a wall, then removed easily. Due to the reusable nature of the adhesive material on the sides 14a and 14b. The invention can be reused over and over.

The reusable adhesive side 14a can also serve as a grippy material for the user to maintain a device such as smartphone 210 or tablet in their hand. The adhesive material 14a will allow the user to stick the invention to his or her hand, while also maintaining adhesion to the device using in the back adhesive side 14b.

Figure 11:
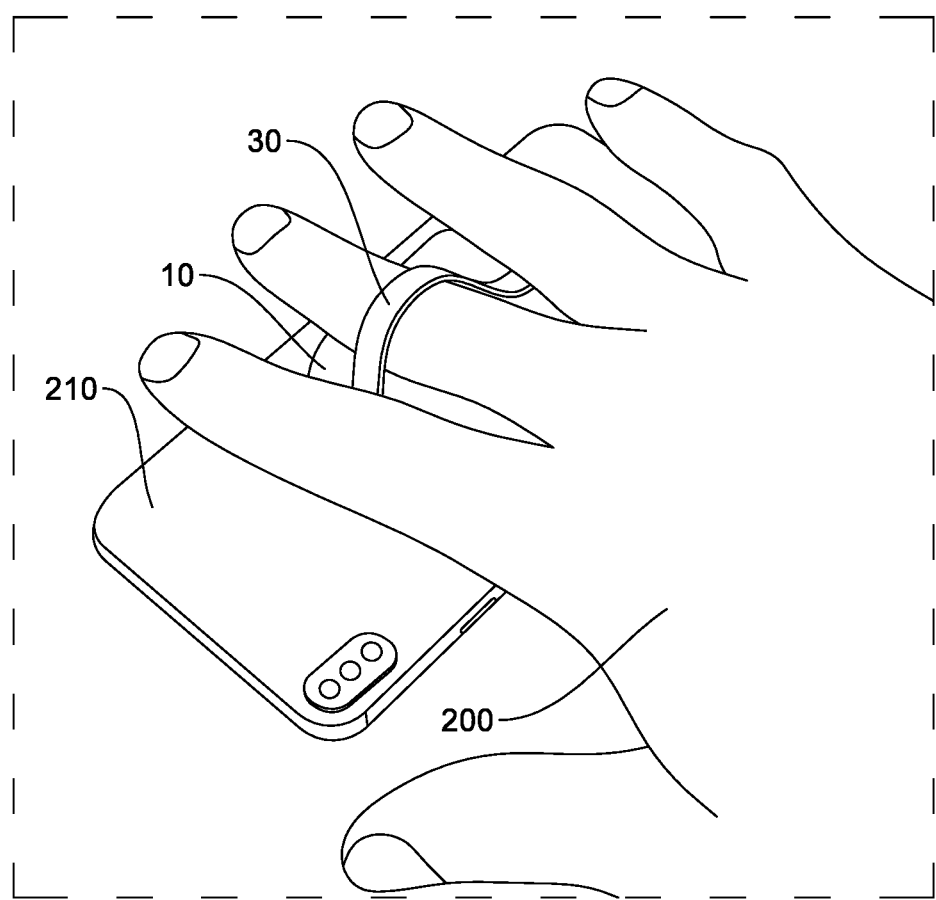
FIG. 11 is a top perspective view of the device of FIG. 7 held by a user's hand.
Figure 12:
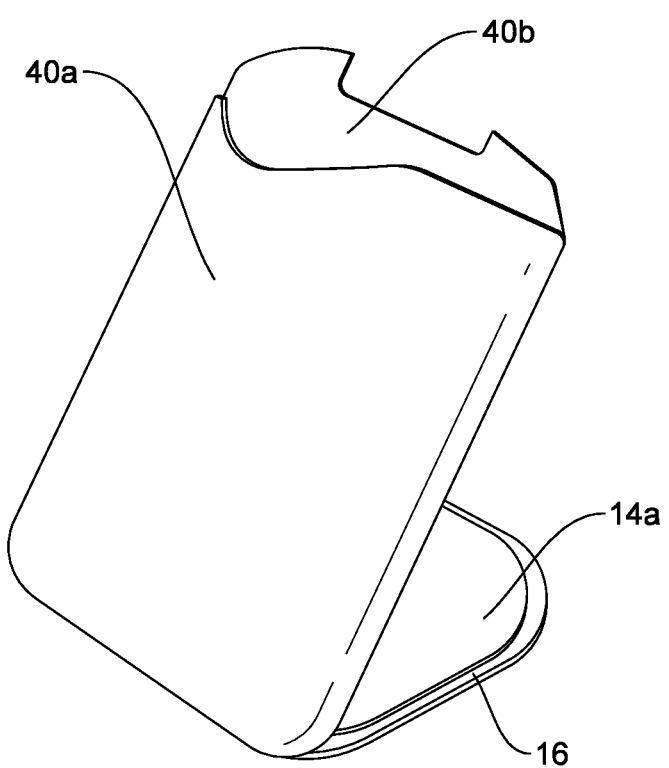
FIG. 12 is a perspective view of another aspect of the device having a pocket.
Figure 13:
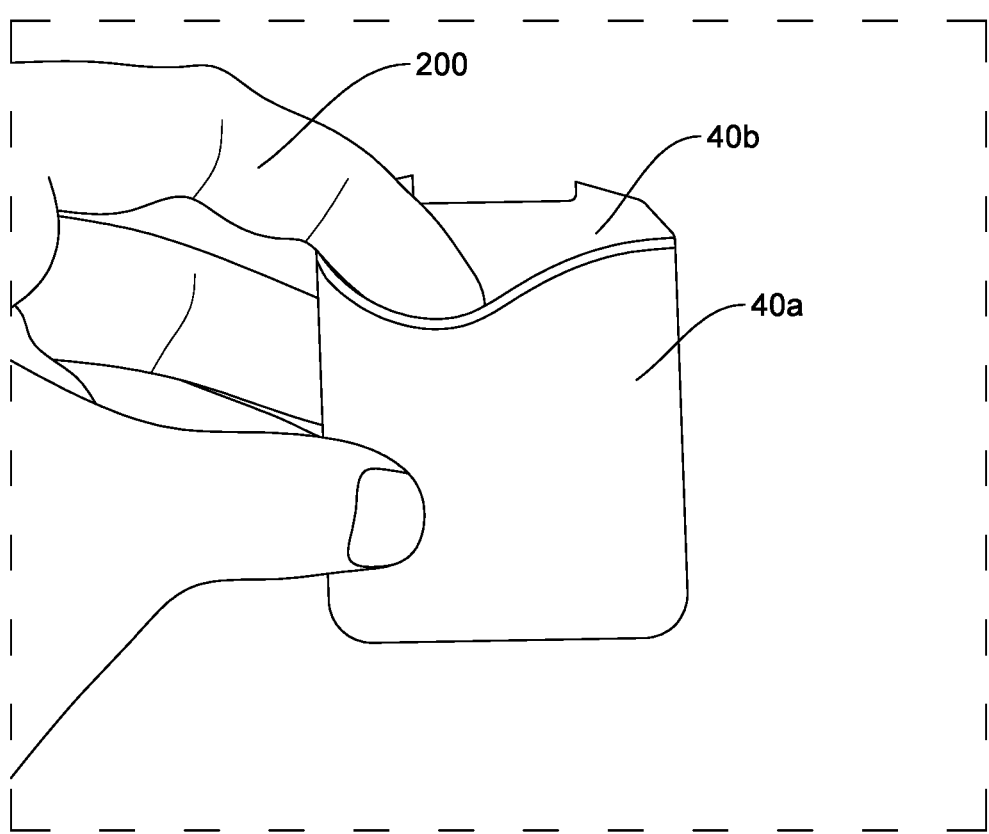
FIG. 13 is a perspective view of the device of FIG. 12 illustrating an opening of the pocket
Figure 14:
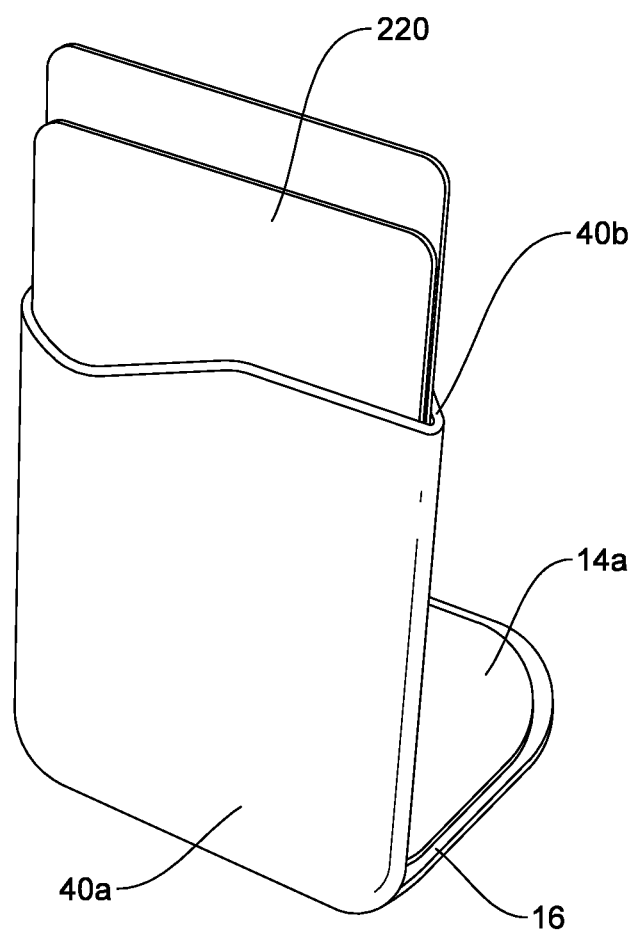
FIG. 14 is a perspective view of the device of FIG. 12 holding credit cards.
Figure 15:
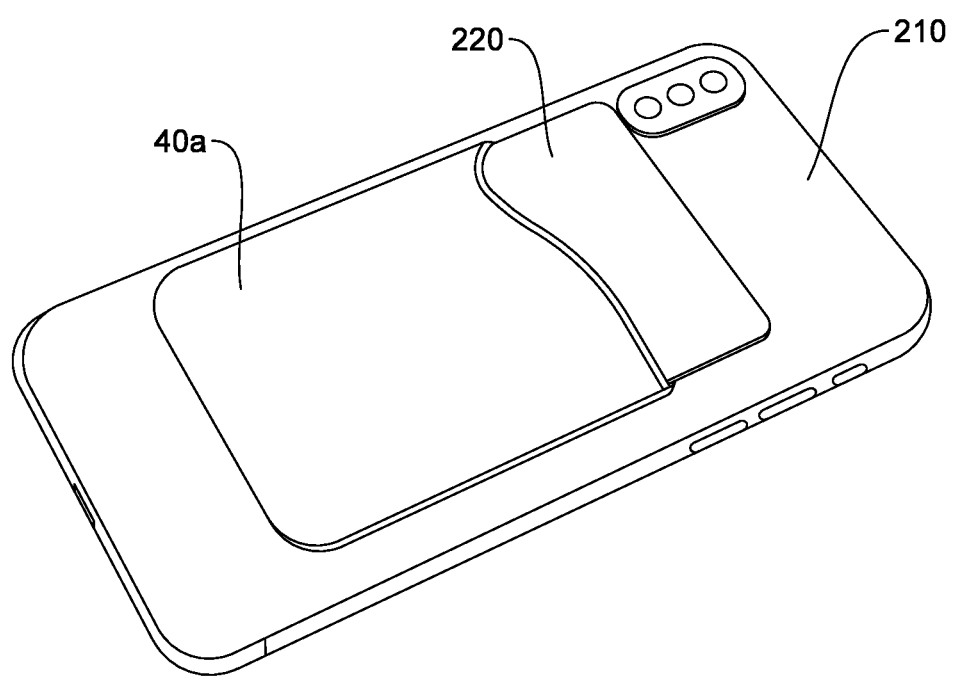
FIG. 15 is a top perspective view of the device of FIG. 14 holding the credit cards in a closed configuration; and, FIG. 16 is a perspective view of the device of FIG. 14 holding the credit cards in a "kickstand" configuration.
Figure 16:
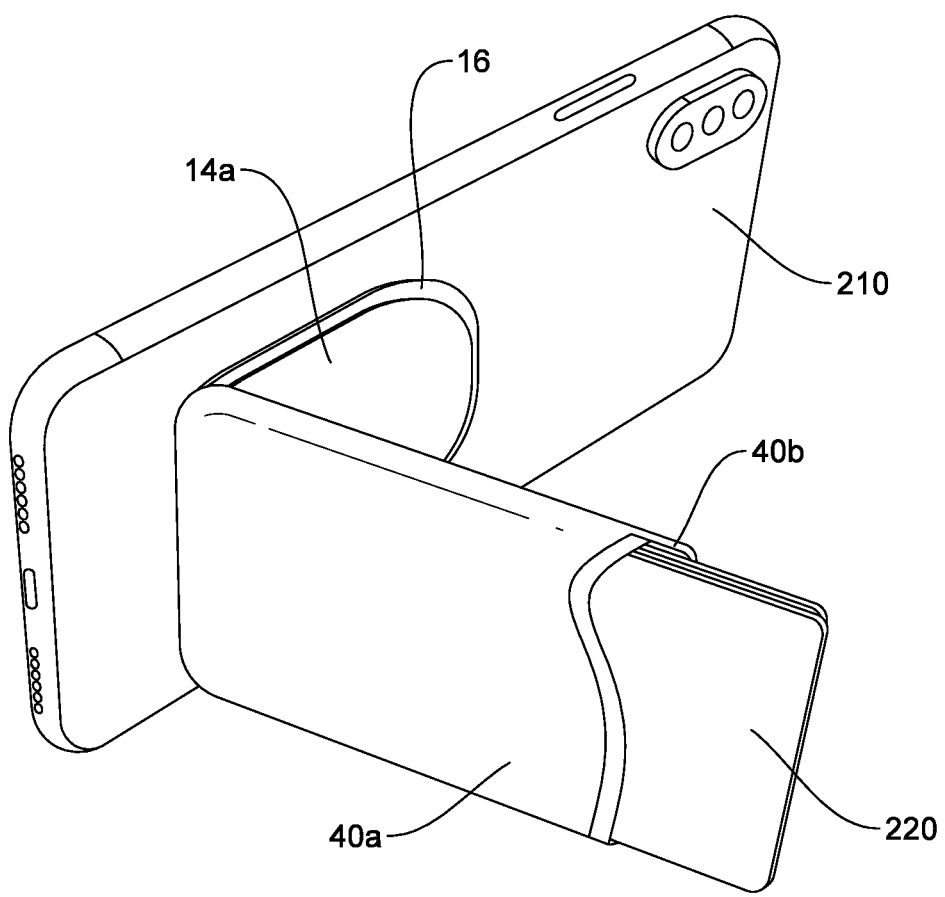

FIGS. 7-11 show a variation of the invention with an added elastic band 30 permanently attached to the top-half 10. This elastic band 30 allows the user to grip the phone with one finger as illustrated in FIG. 11. This may assist in decreasing drops of the phone. This may also assist in taking selfies. This variation maintains the "kickstand" ability and the ability to stick the device to any non-porous or semi-porous surface.

FIGS. 12-16 show a variation of the invention with a sleeve 40a and 40b attached to the top-half 10. Credit cards, debit cards, IDs, and other plastic or paper cards or similar items can be place in sleeve for use as a "wallet." This variation maintains the "kickstand" ability and the ability to stick invention to any non-porous or semi-porous surface.

Many modifications and variations of the present invention are possible in light of the above teachings. It is, therefore, to be understood within the scope of the appended claims the invention may be protected otherwise than as specifically described.

The invention claimed is:

1. A device for mounting to a portable electronic apparatus comprising:
   a first portion;
   a second portion, the second portion having a first side and an opposing second side;
   a hinge connecting the first portion and the second portion;
   a first adhesive material on the first side of the second portion, wherein said first adhesive material is configured to removably attach to an electronic device; and
   a second adhesive material on the second side of the second portion, wherein said second adhesive material is configured to removably attach to a surface, and where the second side of the second portion is an opposing side with respect to the first side of the second portion and the first adhesive material; and
   wherein the first portion is moveable between a first closed configuration where the first portion is folded flat against the second portion about the hinge and a second outward configuration where the first portion can support the electronic apparatus in an upright position.

2. The device of claim 1 wherein the adhesive is reusable.

3. The device of claim 1 wherein the first portion a flat planar sheet.

4. The device of claim 3 wherein the second portion is a flat planar sheet.

5. The device of claim 1 further comprising a layer of a removable film covering the adhesive material on the first side of the second portion.

6. The device of claim 5 further comprising a removable film covering the adhesive material on the second side of the second portion.

7. The device of claim 1 further comprising a band connected to the first portion of the device.

8. The device of claim 7 wherein the band is elastic.

9. The device of claim 1 wherein the first portion includes a pocket.

10. The device of claim 9 wherein the pocket is sized to fit at least one credit card.

11. The device of claim 1 wherein the first portion includes a graphical image.

12. The device of claim 1 wherein the first and second portions are formed from a plastic material.

13. The device of claim 1 wherein the adhesive material is an elastomeric material.

\* \* \* \* \*